United States Patent
Kashida

(10) Patent No.: US 10,628,100 B2
(45) Date of Patent: Apr. 21, 2020

(54) ELECTRONIC DEVICE THAT TRANSMITS USAGE INFORMATION WHEN COMMUNICABLY CONNECTED TO A MEDIATION DEVICE AND DEVICE MANAGEMENT SYSTEM

(71) Applicant: Yona Kashida, Tokyo (JP)

(72) Inventor: Yona Kashida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/181,688

(22) Filed: Nov. 6, 2018

(65) Prior Publication Data
US 2019/0196767 A1 Jun. 27, 2019

(30) Foreign Application Priority Data
Dec. 27, 2017 (JP) ................................. 2017-252638

(51) Int. Cl.
*G06F 3/12* (2006.01)
*H04L 29/08* (2006.01)

(52) U.S. Cl.
CPC .......... *G06F 3/1273* (2013.01); *G06F 3/1204* (2013.01); *G06F 3/1288* (2013.01); *H04L 67/2833* (2013.01); *H04L 67/12* (2013.01)

(58) Field of Classification Search
USPC ....................................................... 358/1.15
See application file for complete search history.

(56) References Cited

U.S. PATENT DOCUMENTS

| | | | |
|---|---|---|---|
| 9,075,971 B2 * | 7/2015 | Towata | ................. G06F 21/608 |
| 2009/0094428 A1 * | 4/2009 | Nagata | ................ G06F 11/2069 |
| | | | 711/162 |
| 2010/0036796 A1 * | 2/2010 | Kajikawa | ........... H04N 1/00389 |
| | | | 706/54 |

(Continued)

FOREIGN PATENT DOCUMENTS

| | | |
|---|---|---|
| JP | 2003-319084 | 11/2003 |
| JP | 2008-033615 | 2/2008 |

OTHER PUBLICATIONS

Atsushi, Printing System Printing Control Program and Recording Medium, Feb. 14, 2008, Machine translated Japanese Patent Application Publication, JP 2008033615 Listed on IDS, all pages (Year: 2008).*

*Primary Examiner* — Lennin R RodriguezGonzalez
(74) *Attorney, Agent, or Firm* — Oblon, McClelland, Maier & Neustadt, L.L.P.

(57) ABSTRACT

An electronic device includes a processor. The processor generates usage information indicating usage of the electronic device according to use of the electronic device. The processor communicates with a mediation device. The mediation device is communicably connected to the electronic device through a first network and to a management device through a second network. The management device collects the usage information via the mediation device. The processor transmits to the mediation device the generated usage information when the electronic device is communicably connected to the mediation device through the first network and stores, in a memory, the generated usage information when the electronic device is disconnected from the mediation device. The processor transmits the usage information stored in the memory to the mediation device when the electronic device reconnects to the mediation device.

9 Claims, 10 Drawing Sheets

(56) References Cited

U.S. PATENT DOCUMENTS

| | | | | |
|---|---|---|---|---|
| 2011/0164886 A1* | 7/2011 | Sawada | ............... | G03G 15/55 |
| | | | | 399/8 |
| 2011/0185295 A1 | 7/2011 | Kashida | | |
| 2013/0016393 A1* | 1/2013 | Oku | ............... | G06F 3/1207 |
| | | | | 358/1.15 |
| 2015/0370519 A1* | 12/2015 | Tachi | ............... | G06F 3/1273 |
| | | | | 358/1.15 |
| 2019/0004759 A1* | 1/2019 | Niimoto | ............... | G06F 3/1274 |

* cited by examiner

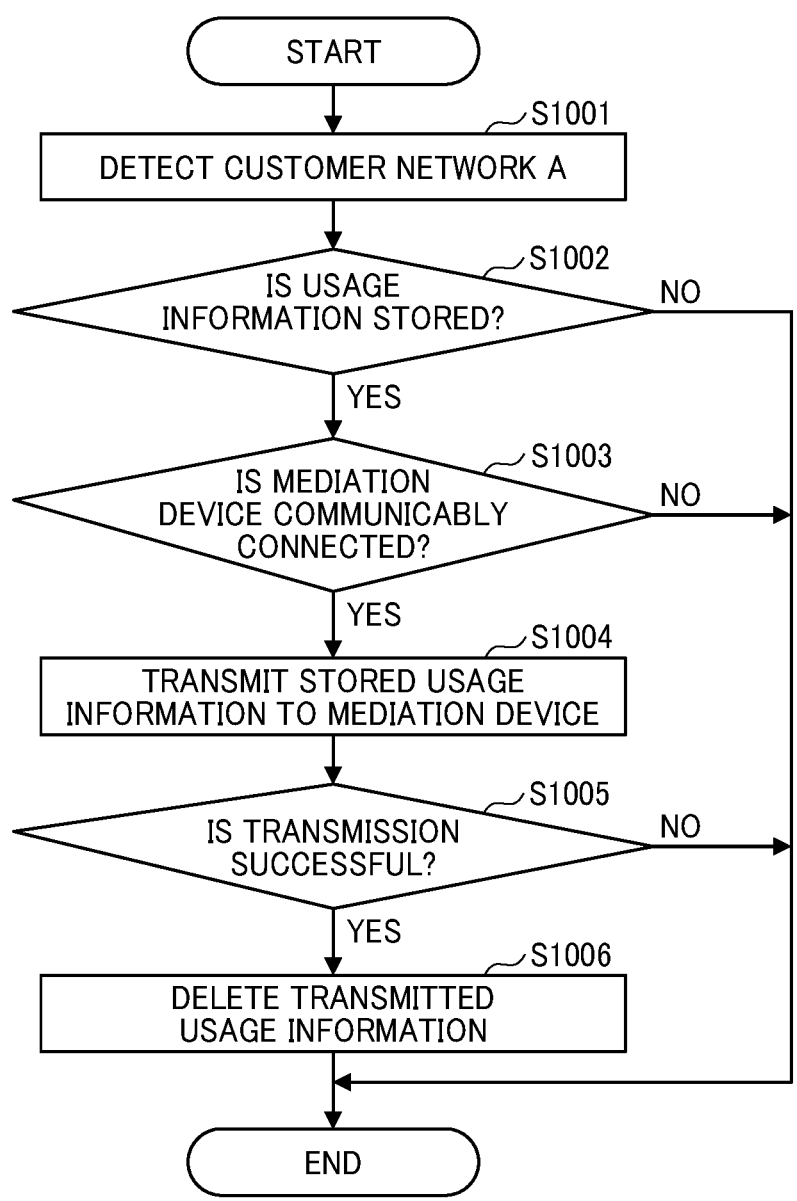

ELECTRONIC DEVICE THAT TRANSMITS USAGE INFORMATION WHEN COMMUNICABLY CONNECTED TO A MEDIATION DEVICE AND DEVICE MANAGEMENT SYSTEM

CROSS-REFERENCE TO RELATED APPLICATION

This patent application is based on and claims priority pursuant to 35 U.S.C. 119(a) to Japanese Patent Application No. 2017-252638, filed on Dec. 27, 2017, in the Japan Patent Office, the entire disclosure of which is hereby incorporated by reference herein.

BACKGROUND

Technical Field

Embodiments of the present disclosure relate to an electronic device and a device management system.

Related Art

A device management system that collects and manages information on usage of an electronic device to be managed by utilizing a network such as the Internet is known. Further, in such a device management system, a mediation device may be provided in a local network in order to collect information on usage of an electronic device in the local network.

For example, a technology using a log collection server provided in a local network to collect print logs from client terminals and transmit the print logs accumulated in the log collection server to a management server is known.

SUMMARY

An exemplary embodiment of the present disclosure includes an electronic device including a processor. The processor generates usage information indicating usage of the electronic device according to use of the electronic device. The processor communicates with a mediation device. The mediation device is communicably connected to the electronic device through a first network and to a management device through a second network. The management device collects the usage information via the mediation device. The processor transmits to the mediation device the generated usage information when the electronic device is communicably connected to the mediation device through the first network and stores, in a memory, the generated usage information when the electronic device is disconnected from the mediation device. The processor transmits the usage information stored in the memory to the mediation device when the electronic device reconnects to the mediation device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is a flowchart illustrating another example of the operation of the electronic device according the second embodiment of the present disclosure.

Figure 1:
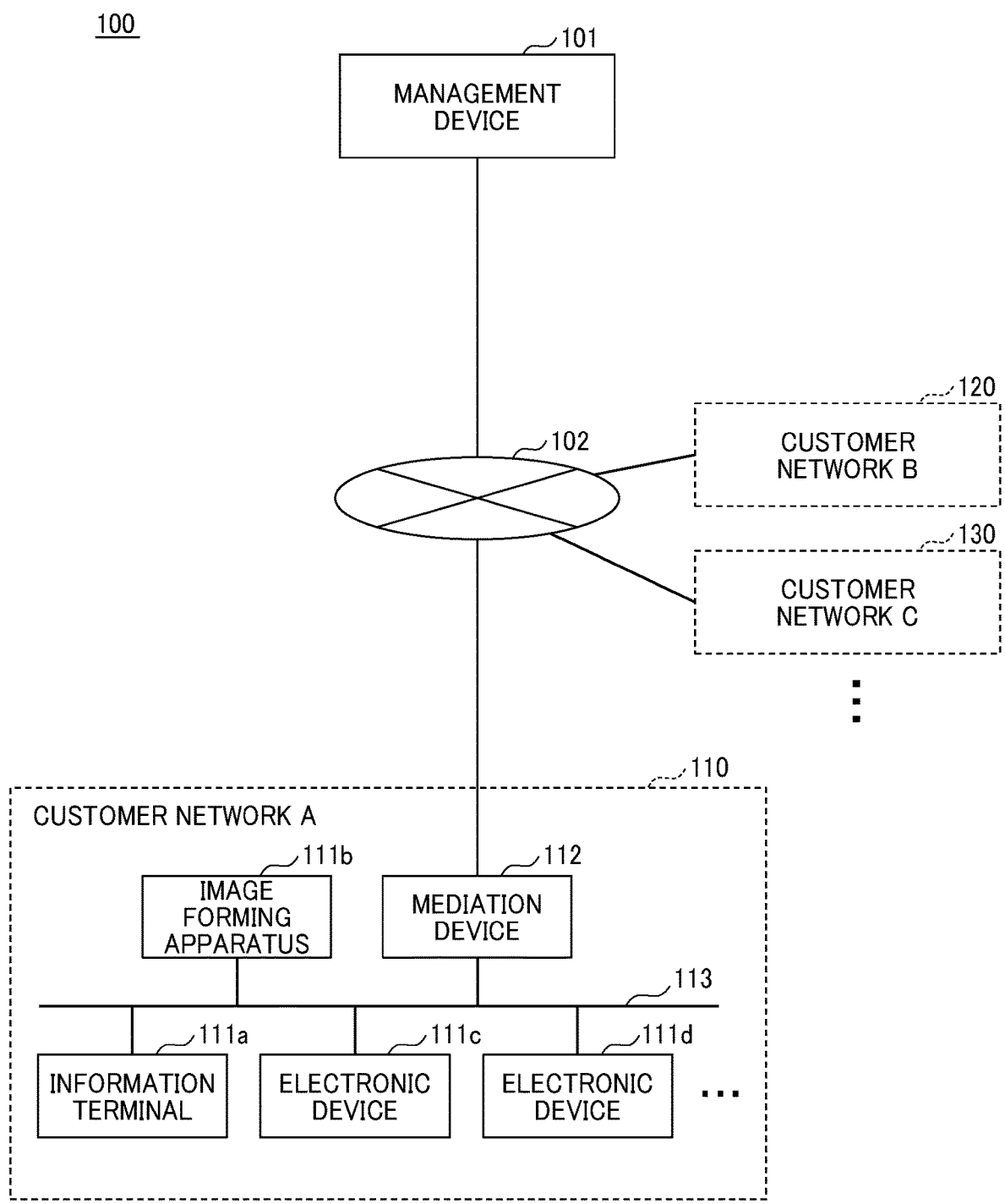
FIG. 1 is a block diagram illustrating a system configuration of a device management system according to one of embodiments of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of the present disclosure are described below with reference to the attached drawings.

System Configuration

FIG. 1 is a block diagram illustrating a system configuration of a device management system 100 according to one of embodiments of the present disclosure. The device management system 100 according to the present embodiment is a system in which a management device 101 uses mediation device 112 provided in a customer network A 110 to collect information on usage of one or more electronic devices, which are provided in the customer network A 110, to be managed and manage the collected information. Hereinafter, the one or more electronic devices to be managed may be also referred to as management target devices. In addition, hereinafter, the information on usage of each electronic device may be also referred to as "usage information of an electronic device" or "usage information".

The customer network A 110 is a local network provided by a customer such as a company using a device management service provided by the device management system 100. In addition, the management device 101 may collect information on usage (usage information) of an electronic device to be managed, which is provided in other than the customer network A 110, for example, in a customer network B 120 and a customer network C 130 and manage the collected usage information.

The customer network A 110 includes an information terminal 111a, an image forming apparatus 111b, a plurality of electronic devices 111c, 111d, and so forth, and the mediation device 112 each of which is connected to, for example, a local area network (LAN) 113. The information terminal 111a, the image forming apparatus 111b, and the plurality of electronic devices 111c, 111d, and so forth, are examples of the electronic devices to be managed by the management device 101. In the following description, the "electronic device 111" is used to indicate any electronic device among information terminal 111a, the image forming apparatus 111b, and the plurality of electronic devices 111c, 111d, and so forth.

Examples of the information terminal 111a include information processing devices such as a note personal computer (PC), a tablet terminal, and a smartphone. The information terminal 111a has a function of controlling printing. Namely, the information terminal 111a executes printing. With the function, the information terminal 111a causes the image forming apparatus 111b, which is connected through the LAN 113, to print document data, for example.

The image forming apparatus 111b is, for example, a printer or a digital multifunction peripheral, having a printing function. The image forming apparatus 111b prints document data under control of the information terminal 111a, for example.

The electronic devices 111c and 111d are electronic devices, such as projectors, video conference terminals, and scanners, each of which has a communication function.

The mediation device 112 is a communication device that is communicably connected to the electronic devices 111, which are the management target devices, through the LAN (first network) 113, and is communicably connected to the management device 101 through a network (second network) 102 such as the Internet. The mediation device 112 acquires information on the usage of each of the electronic devices 111, which are the management target devices, through the LAN 113, and transmits the acquired usage information to the management device 101 through the network 102.

The management device 101 is a system that includes, for example, one or more information processing devices, such as a PC. The management device 101 is communicably connected to the mediation device 112 through the network 102. In addition, the management device 101 collects information on the usage of each of the electronic devices 111, which are the management target devices, provided in the customer network A 110 via the mediation device 112 and manages the collected usage information.

With the configuration described above, the information terminal 111a generates a print log (an example of usage information) in which print content is recorded, when executing printing by using the image forming apparatus 111b, for example. Then, the information terminal 111a transmits the generated print log to the mediation device 112 through the LAN 113.

The mediation device 112 receives the print log transmitted from the information terminal 111a through the LAN 113 and transmits the received print log to the management device 101 through the network 102.

As with the information terminal 111a, each of other electronic devices 111, which are the management target devices, generates usage information, in which usage content according to use of the corresponding electronic device 111 is recorded, and transmits the generated usage information to the mediation device 112. The management device 101 can collect the information on the usage of each of the electronic devices 111, which is are the management target devices, provided in the customer network 110, via the mediation device 112, which is provided in the customer network 110.

Figure 2:
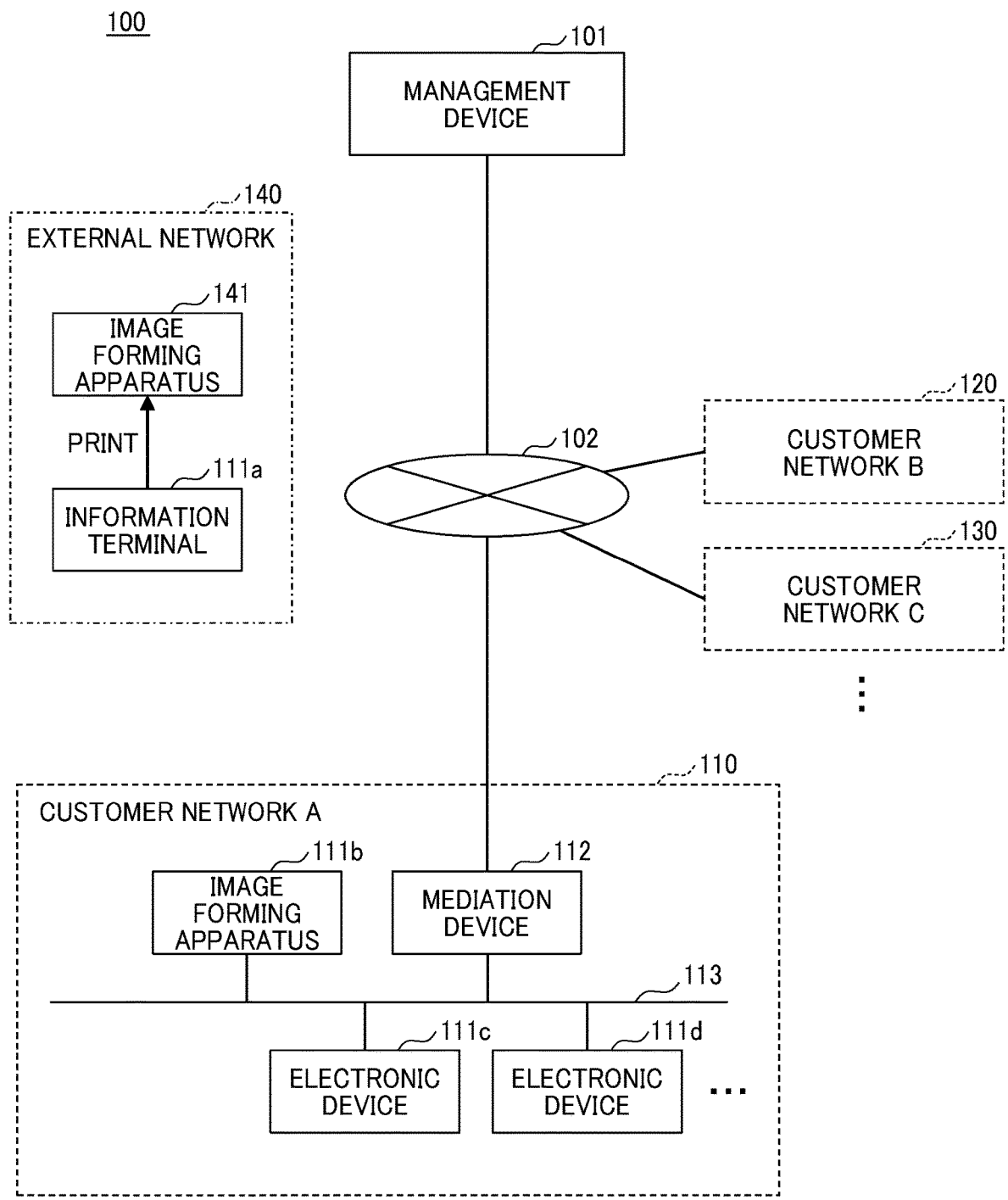
FIG. 2 is a block diagram illustrating an example of a case in which a print log is unable to be acquired according to one of embodiments of the present disclosure.

In the device management system 100 described above, there may be a case where the information terminal 111a is taken out of the customer network A 110 and used to execute printing by using the image forming apparatus 141 provided in an external network 140 as illustrated in FIG. 2, for example. In this case, the information terminal 111a is not able to transmit the print log to the mediation device 112 so that the management device 101 is not able to collect the print log of the information terminal 111a.

To cope with this, the information terminal 111a according to the present embodiment temporarily stores (accumulates) the print log in a storage unit (memory) when the information terminal 111a is not communicably connected with, or is disconnected from, the mediation device 112. When it becomes to be possible for the information terminal 111a to communicate with the mediation device 112 again by reconnecting to the LAN 113 of the customer network A 110, as illustrated in FIG. 1, the information terminal 111a transmits the print log stored in the storage unit to the mediation device 112 and then deletes the print log from the storage unit.

The print log includes information in which the print content is recorded as image information, or image data. Thus, an administrator can manage the print content printed by the information terminal 111a in the customer network A 110 and the external network 140, for example.

The print log is an example of the information on the usage of each of the electronic devices 111, which are the management target devices. The information on the usage of the electronic device 111 may be, for example, a communication log of a portable videoconference terminal, a projection log of a projector, or the like.

The system configuration of the device management system 100 illustrated in FIG. 1 is merely an example. Any other suitable system configuration may be used. For example, a system configuration in which the management device 101 communicates with the mediation device 112 through a firewall or the like provided in the customer network A 110 may be used.

Hardware Configuration

Each of the information terminal 111a, the management device 101, the image forming apparatus 111b, the electronic devices 111c and 111d, and the mediation device 112, which are illustrated in FIG. 1, has a hardware configuration of a general-purpose computer. An example of the hardware configuration of a general-purpose computer 300 is described below.

Figure 3:
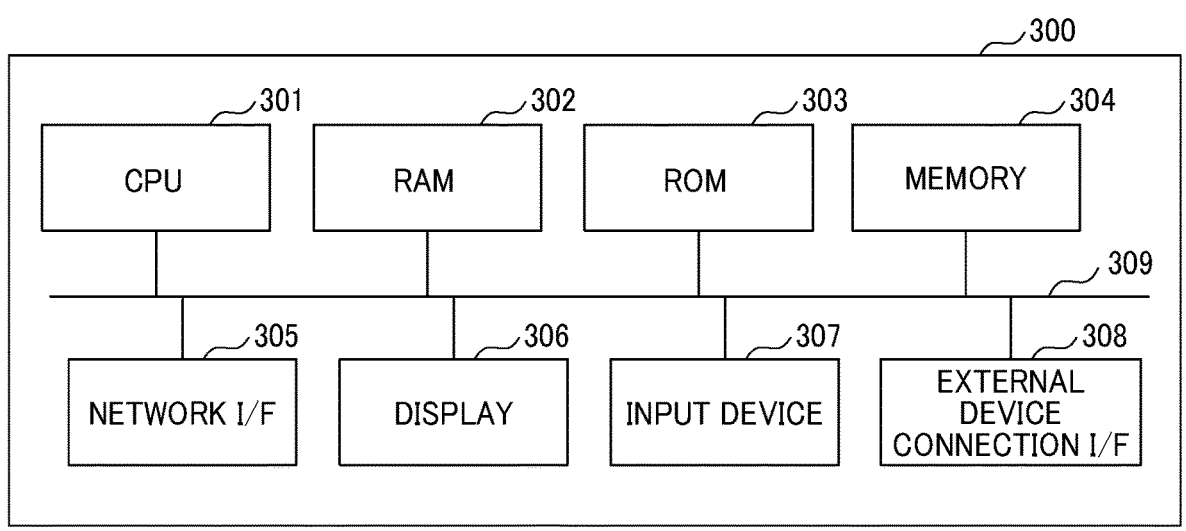
FIG. 3 is a block diagram illustrating a hardware configuration of a computer according to one of the embodiments of the present disclosure.

FIG. 3 is a block diagram illustrating the hardware configuration of the computer 300 according to one of the embodiments of the present disclosure. The computer 300 includes, for example, a central processing unit (CPU) 301, a random access memory (RAM) 302, a read only memory (ROM) 303, a memory 304, a network interface (I/F) 305, a display 306, an input device 307, an external device connection I/F 308, and a bus 309.

The CPU 301 is an arithmetic device that implements the functions of the computer 300 by reading programs and data stored in the ROM 303, the memory 304, or the like onto the RAM 302 and executing processing. The RAM 302 is a volatile memory to be used as a work area for the CPU 301. The ROM 303 is a non-volatile memory that can retain the programs and data even after having been turned off.

The memory 304 is a storage device such as a hard disk drive (HDD), a solid state drive (SSD), or the like, and stores an operating system (OS), an application program, various data, or the like.

The network I/F 305 is a communication interface such as a wired or a wireless LAN for connecting the computer 300 to the network 102 or the LAN 113. When the computer 300 is the mediation device 112, the network I/F 305 includes two communication interfaces.

The display 306 is a device for displaying processing results of the computer 300, for example. The input device 307 is a device for receiving an input according to a user operation. Examples of the input device 307 include a pointing device, a keyboard, and a touch panel. In addition, the display 306 and the input device 307 may be combined to be a display and input device, such as a touch panel display.

The external device connection I/F 308 is an interface for connecting an external device to the computer 300. The external device includes, for example, a storage device and an electronic device, such as an image forming apparatus. The computer 300 installs a predetermined program stored in a recording medium on the computer 300 via the external device connection I/F 308 to execute the predetermined program.

The bus 309 is connected to each of the above-described components and transfers address signals, data signals, and various types of control signals.

Functional Configuration

A functional configuration of the device management system 100 is described below.

First Embodiment

Figure 4:
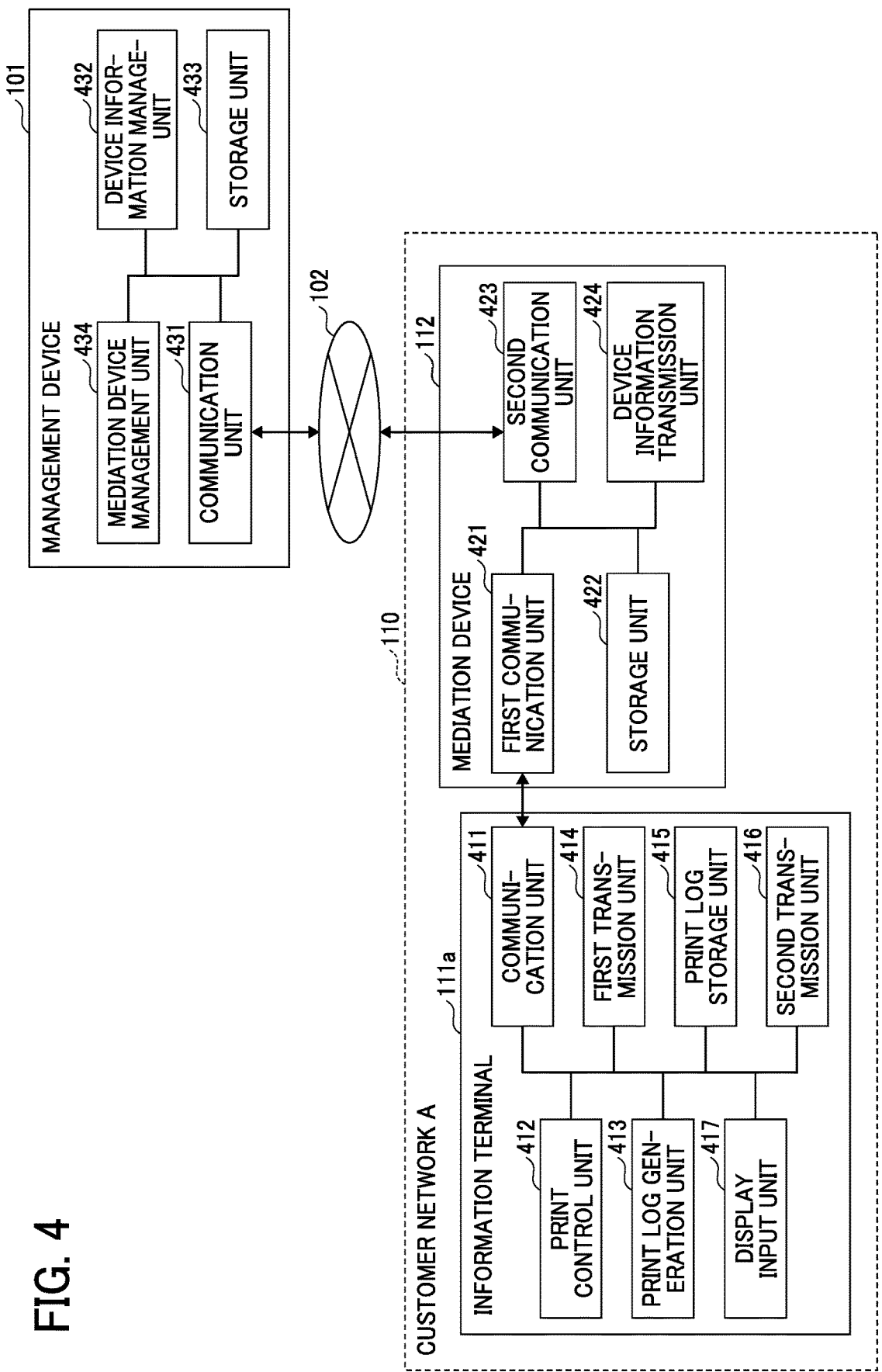
FIG. 4 is a block diagram illustrating a functional configuration of a device management system according to a first embodiment of the present disclosure.

FIG. 4 is a block diagram illustrating a functional configuration of the device management system 100 according to a first embodiment of the present disclosure.

Functional Configuration of Information Terminal

The information terminal 111*a* includes, for example, a communication unit 411, a print control unit 412, a print log generation unit 413, a first transmission unit 414, a print log storage unit 415, a second transmission unit 416, and a display input unit 417. Each of the above-mentioned functional units of the information terminal 111*a* is implemented by the CPU 301 executing a predetermined program, for example.

The communication unit 411 is implemented by the CPU 301 executing a program and the network I/F 305, for example. The communication unit 411 connects the information terminal 111*a* to the LAN 113 so that the information terminal 111*a* is communicably connected to, or can communicate with, for example, the mediation device 112 and the image forming apparatus 111*b*.

The print control unit 412 is implemented by a program executed by the CPU 301, for example. The print control unit 412 executes printing of document data by using the image forming apparatus 111*b* and the image forming apparatus 141, for example.

The print log generation unit (generator) 413 is implemented by a program executed by the CPU 301, for example. The print log generation unit 413 generates a print log (an example of the usage information) in which print content, a print result, or the like is recorded according to the printing executed by the print control unit 412. The print log generated by the print log generation unit 413 includes information in which the print content is recorded as image information, or image data.

The first transmission unit 414 is implemented by a program executed by the CPU 301, for example. The first transmission unit 414 transmits a print log to the mediation device 112, when the print log generation unit 413 generates the print log and when the communication unit 411 succeeds in communicating with the mediation device 112.

The print log storage unit (storage unit) 415 is implemented by the CPU 301 executing a program and the memory 304, for example. The print log storage unit 415 stores a print log when the print log generation unit 413 generates the print log and when the communication unit 411 fails to communicate with the mediation device 112.

The second transmission unit 416 is implemented by a program executed by the CPU 301, for example. The second transmission unit 416 transmits the print log stored in the print log storage unit 415 to the mediation device 112, when the communication unit 411 becomes to be communicably connected to the mediation device 112. The second transmission unit 416 may be a transmission unit that is separated from the first transmission unit 414 or may be a transmission unit that is combined together with the first transmission unit.

The display input unit 417 is implemented by a program executed by the CPU 301, for example. The display input unit 417 receives a user operation, such as an operation of printing, performed with the input device 307 and displays a display screen by using the display 306, for example.

Functional Configuration of Mediation Device

The mediation device 112 includes, for example, a first communication unit 421, a storage unit 422, a second communication unit 423, and a device information transmission unit 424. Each of the above-mentioned functional units of the mediation device 112 is implemented by the CPU 301 executing a predetermined program, for example.

The first communication unit 421 is implemented by the CPU 301 executing a program and one of two communication interfaces included in the network I/F 305, for example. The first communication unit 421 connects the mediation device 112 to the LAN 113 and communicates with, for example, the information terminal 111*a*, the image forming apparatus 111*b*, the electronic devices 111*c*, and the electronic devices 111*d*.

The second communication unit 423 is implemented by the CPU 301 executing a program and the other one of the two communication interfaces included in the network I/F 305, for example. The second communication unit 423 connects the mediation device 112 to the network 102 and communicates with the management device 101, for example.

The storage unit 422 is implemented by the CPU 301 executing a program and the memory 304, for example. The storage unit 422 stores the print logs of the information terminal 111a received by the first communication unit 421 and the information on the usage of the electronic device 111, for example.

The device information transmission unit 424 is implemented by a program executed by the CPU 301, for example. The device information transmission unit 424 transmits a print log of the information terminal 111a, information on the usage of the electronic device 111, or the like, which is stored in the storage unit 422, to the management device 101 via the second communication unit 423. In addition, the device information transmission unit 424 may transmit the print log of the information terminal 111a, the information on the usage of the electronic device 111, or the like, which is stored in the storage unit 422, to the management device 101 in response to a request from the management device 101.

Functional Configuration of Management Device

The management device 101 includes, for example, a communication unit 431, a device information management unit 432, a storage unit 433, and a mediation device management unit 434. Each of the above-mentioned functional units of the management device 101 is implemented by the CPU 301 executing a predetermined program, for example.

The communication unit 431 is implemented by the CPU 301 executing a program and the network I/F 305, for example. The communication unit 431 connects the management device 101 to the network 102 so that the management device 101 is communicably connected to mediation device 112, for example.

The device information management unit 432 is implemented by a program executed by the CPU 301, for example. The device information management unit 432 receives a print log of the information terminal 111a, information on the usage of the electronic device 111, or the like, which is transmitted from the mediation device 112 via the communication unit 431 and stores the received information in the storage unit 433 to manage the stored information.

The storage unit 433 is implemented by the CPU 301 executing a program and the memory 304, for example. The storage unit 433 stores, for example, a print log of the information terminal 111a, information on the usage of the electronic device 111, information on the mediation device 112, or the like.

The mediation device management unit 434 is implemented by, for example, a program executed by the CPU 301 and manages the mediation device 112. The mediation device management unit 434 manages the information on the mediation device 112 by storing the information on the mediation device 112 in the storage unit 433. The information on the mediation device 112 includes connection information (for example, address information, authentication information, etc.) for connecting to the mediation device 112, information on the electronic devices 111 of which the usage information is collected by the mediation device 112.

The above-described configuration allows the management device 101 to collect the usage information, such as a print log of the information terminal 111a to be managed, by using the mediation device 112 installed in the customer network A 110.

Processing Flow A processing flow of a method of managing devices according to the present embodiment is described below.

Operation of Information Terminal in Executing Printing

Figure 5:
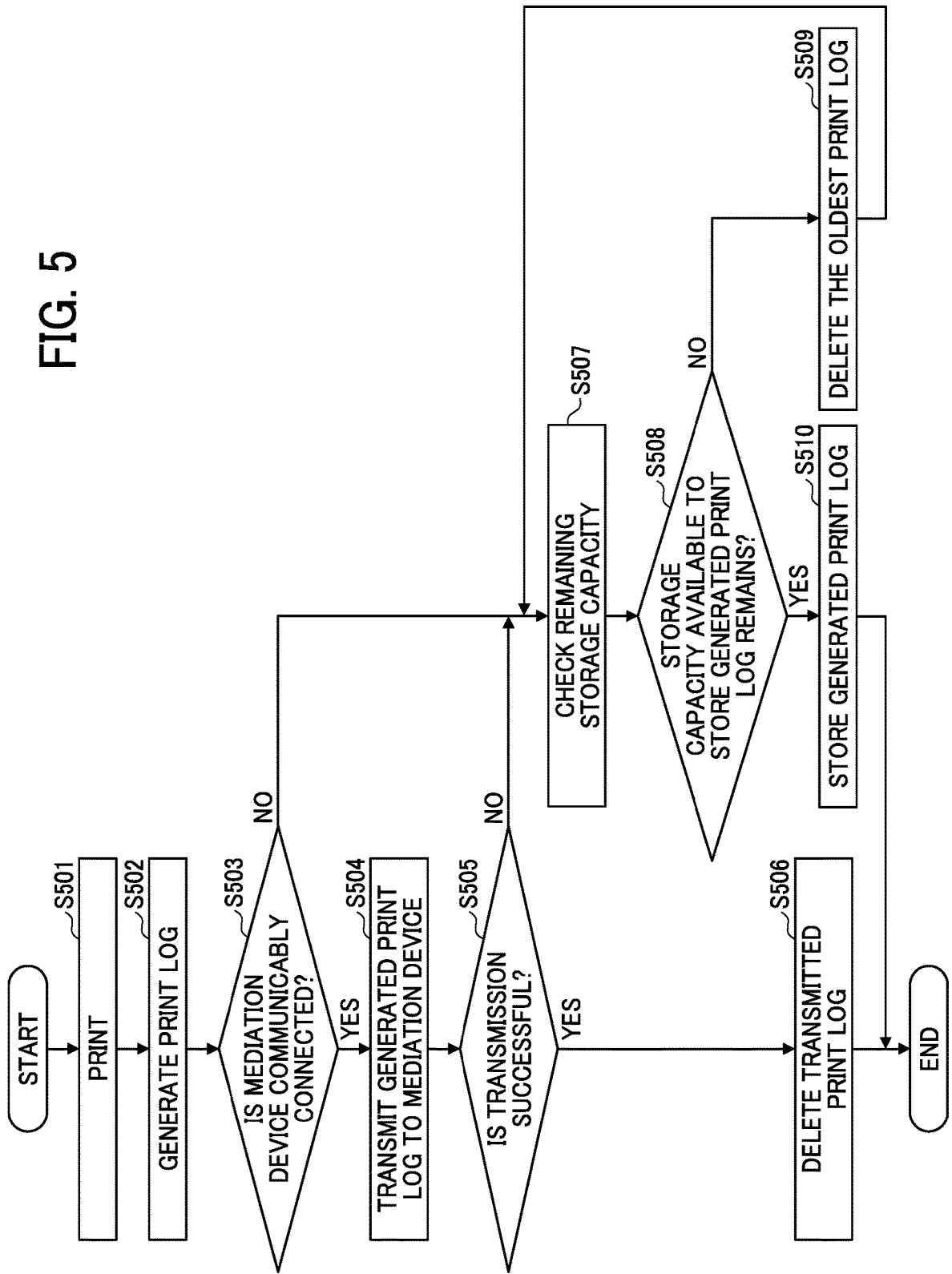
FIG. 5 is a flowchart illustrating an example of operation of an information terminal according the first embodiment of the present disclosure.

FIG. 5 is a flowchart illustrating an example of the operation of the information terminal 111a according to the first embodiment of the present disclosure. The operation illustrated in FIG. 5 is an example of a process performed by the information terminal 111a in executing printing by using the image forming apparatus 111b, the image forming apparatus 141, or the like.

In Step S501, the print control unit 412 executes printing. After the print control unit 412 execute the printing in Step S501, the information terminal 111a performs processing of Step S502 and the subsequent steps.

In Step S502, the print log generation unit 413 generates a print log (an example of the usage information) in which information such as print content or a print result is recorded. The print log includes, for example, information indicating what is printed, how many sheets are used to execute the printing, and how or where in the sheet the printing is executed.

The print log generated by the print log generation unit 413 includes information in which the print content is recorded as image information, or image data.

In Step S503, the communication unit 411 determines whether the mediation device 112 and the information terminal 111a are communicably connected to each other through the LAN 113 or not. Namely, the communication unit 411 determines whether the mediation device 112 is communicably connected to the information terminal 111a. When the mediation device 112 and the information terminal 111a are communicably connected to each other, the process proceeds to Step S504. On the other hand, when the mediation device 112 and the information terminal 111a are not communicably connected to each other, namely, are disconnected from each other, the process proceeds to Step S507.

In Step S504, the first transmission unit 414 transmits the print log generated by the print log generation unit 413 to the mediation device 112 via the communication unit 411.

In Step S505, the information terminal 111a determines whether the transmission of the print log is successful or not. When the transmission of the print log is successful, the process performed by the information terminal 111a proceeds to Step S506. On the other hand, when the transmission of the print log fails, the process performed by the information terminal 111a proceeds to Step S507.

The information terminal 111a may determine that the transmission of the print log fails when the first transmission unit 414 retries to transmit the print log, or transmits the print log for predetermined times, which may be set by a designer or a user, and then fails to transmit the print log to the mediation device 112, or the mediation device 112 fails to receive the print log transmitted from the information terminal 111a. Hereinafter, to "transmit for the predetermined times" or to "repeatedly transmit" may be simply referred to as to "retry".

In Step S506, the transmitted print log is deleted from the print log storage unit 415.

In Step S507, a remaining storage capacity in the print log storage unit 415 is checked. For example, the print log storage unit 415 is set to store a print log within a range of a predetermined storage capacity, which may be set by a designer or a user. The print log storage unit 415, accordingly, checks a storage capacity available to newly store a print log in the range of the predetermined storage capacity.

In Step S508, a determination whether there is a storage capacity available to newly store the print log (new print log) generated in Step S502 within the range of the predetermined storage capacity in the print log storage unit 415 is made. When a determination result indicates that the print log storage unit 415 is not available to store the generated print log, the process proceeds to step S509. On the other hand, when a determination result indicates that the print log storage unit 415 is available to store the generated print log, the process proceeds to step S510.

In Step S509, the oldest print log among the print logs stored in the print log storage unit 415 is deleted, and the process returns to Step S507. Thus, the print log storage unit 415 can increase the remaining storage capacity of the predetermined storage capacity.

On the other hand, in Step S510 after Step S508, the print log storage unit 415 stores the print log generated by the print log generation unit 413 in Step S502, by using the memory 304, for example.

As described above, the information terminal 111a communicably connected to the mediation device 112 transmits, to the mediation device 112, the print log generated according to execution of the printing. In addition, the information terminal 111a, which is not communicably connected to the mediation device 112, saves the generated print log according to execution of the printing.

Operation of Information Terminal in Connecting to LAN

Figure 6:
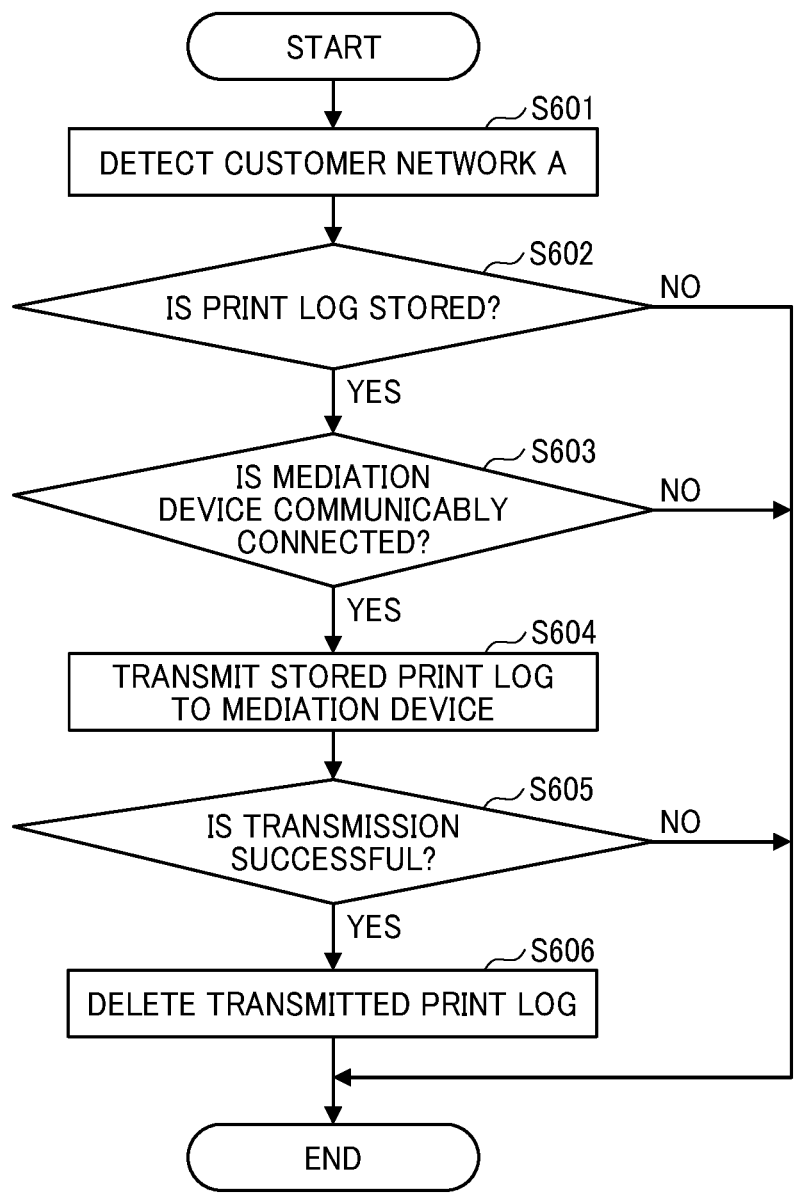
FIG. 6 is a flowchart illustrating another example of the operation of the information terminal according the first embodiment of the present disclosure.

FIG. 6 is another flowchart illustrating an example of the operation of the information terminal 111a according the first embodiment of the present disclosure. The operation illustrated in FIG. 6 is an example of a process performed by the information terminal 111a in reconnecting to the LAN 113 of the customer network A 110.

In Step S601, the information terminal 111a detects the customer network A110. Upon detecting the customer network A 110 in Step S601, the information terminal 111a performs the processing of Step 602 and the subsequent steps. For example, when the communication unit 411 connects to the LAN 113 of the customer network A 110, the information terminal 111a determines that the customer network A 110 is detected.

In Step S602, a determination whether a print log that is not transmitted to the mediation device 112 is stored in the print log storage unit 415 or not is made. When the print log is not stored, the information terminal 111a ends the process. On the other hand, when the print log is stored, the process performed by the information terminal 111a proceeds to Step S603.

In Step S603, the communication unit 411 determines whether the mediation device 112 and the information terminal 111a are communicably connected to each other through the LAN 113 or not. Namely, the communication unit 411 determines whether the mediation device 112 is communicably connected to the information terminal 111a. When the mediation device 112 and the information terminal 111a are not communicably connected to each other, the process performed by the information terminal 111a ends. When the mediation device 112 and the information terminal 111a are communicably connected to each other, the process proceeds to Step S604.

In Step S604, the second transmission unit 416 transmits the print log stored in the print log storage unit 415 to the mediation device 112 via the communication unit 411.

In step S605, the information terminal 111a determines whether the transmission of the print log is successful or not. When the transmission of the print log is successful, the process performed by the information terminal 111a proceeds to Step S606. On the other hand, when the transmission of the print log fails, the process performed by the information terminal 111a ends.

The information terminal 111a may determine that the transmission of the print log fails when the second transmission unit 416 retries the transmission of the print log for predetermined times, which may be set by a designer or a user, and fails to transmit the print log to the mediation device 112.

In Step S606, the transmitted print log is deleted from the print log storage unit 415.

As described above, the information terminal 111a transmits the print log stored in the print log storage unit 415 to the mediation device 112, when becoming to be communicably connected to the mediation device 112.

Operation of Device Management System

Figure 7:
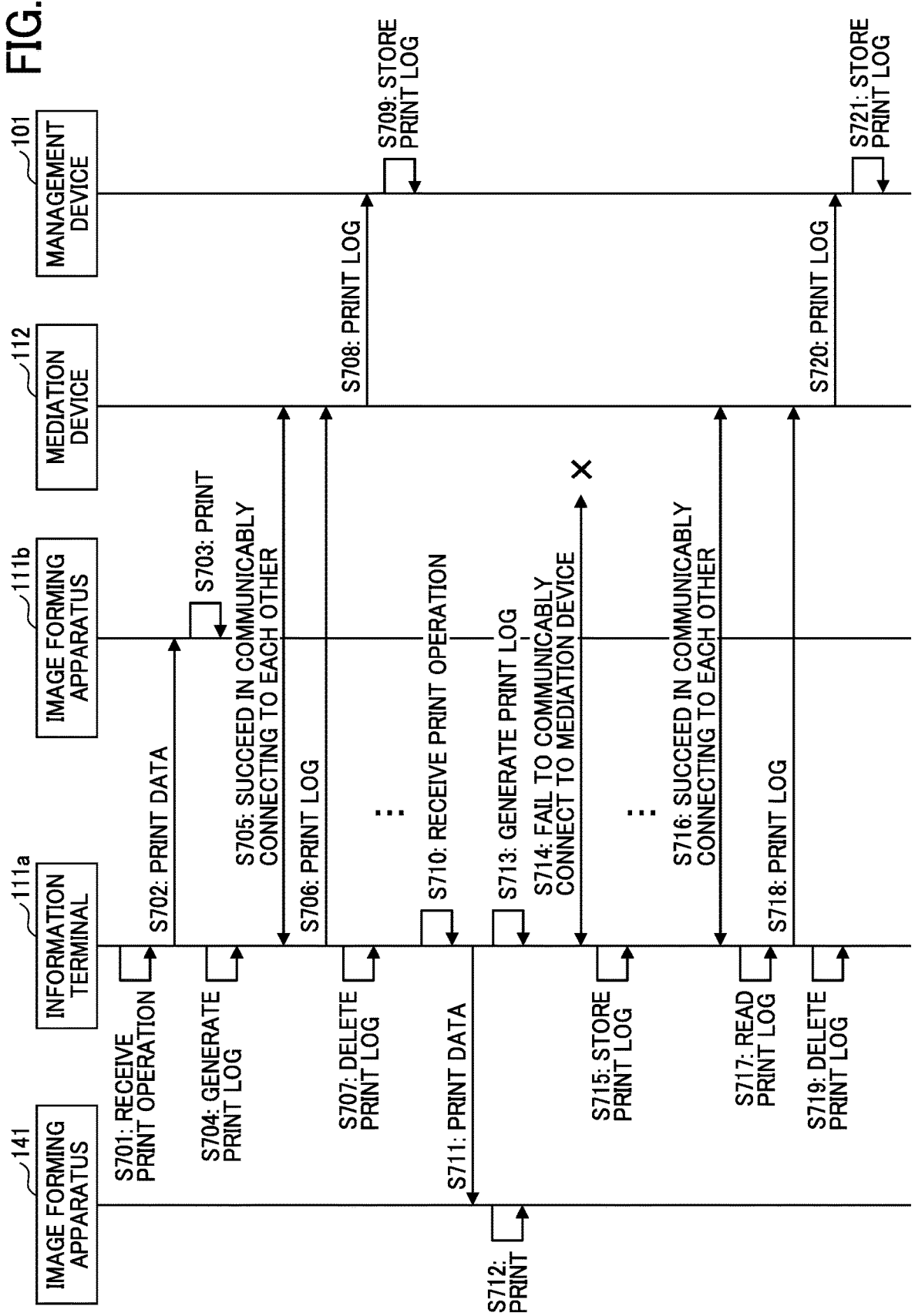
FIG. 7 is a sequence diagram illustrating an example of operation of the device management system according to the first embodiment of the present disclosure.

FIG. 7 is a sequence diagram illustrating an example of the operation of the device management system 100 according to the first embodiment of the present disclosure. The operation, illustrated in FIG. 7, performed by the entire device management system 100 according to the first embodiment is a process corresponding to each of processes illustrated in FIG. 5 and FIG. 6, performed by the information terminal 111a. In the example of FIG. 7, at the start of the process illustrated in FIG. 7, the information terminal 111a is connected to the LAN 113 of the customer network A 110 and is communicably connected to the mediation device 112 as illustrated in FIG. 1.

In Step S701, the print control unit 412 of the information terminal 111a receives an operation of printing (print operation) performed by a user via the display input unit 417.

In Step S702, the print control unit 412 of the information terminal 111a generates print data to be printed by using the image forming apparatus 111b according to the received operation of printing and transmits the print data to the image forming apparatus 111b.

In Step S703, the image forming apparatus 111b prints the print data transmitted from the information terminal 111a.

In Step S704, the print log generation unit 413 of the information terminal 111a generates a print log in which information such as print content, a print result, or the like of the printing performed by the print control unit 412 is recorded.

In Step S705, the communication unit 411 of the information terminal 111a checks whether the information terminal 111a and the mediation device 112 are communicably connected to each other. As illustrated in FIG. 1, the information terminal 111a is connected to the mediation device 112 through the LAN 113, thereby succeeding in communicating with the mediation device 112.

In Step S706, when the information terminal 111a succeeds in communicating with the mediation device 112, the first transmission unit 414 transmits the print log generated by the print log generation unit 413 to the mediation device 112 via the communication unit 411.

In Step S707, the print log transmitted by the first transmission unit 414 is deleted from the print log storage unit 415 of the information terminal 111a.

In Step S708, the device information transmission unit 424 of the mediation device 112 transmits the print log received from the information terminal 111a via the first communication unit 421 to the management device 101 via the second communication unit 423.

As another example, the mediation device 112 may store the print log received from the information terminal 111a in the storage unit 422, and the device information transmission unit 424 may transmit the print log stored in the storage unit 422 to the management device 101 in response to a request from the management device 101.

In Step S709, the device information management unit 432 of the management device 101 stores the print log of the information terminal 111a received from the mediation device 112 in the storage unit 433.

As described above, for example, when the information terminal 111a executes the printing in the customer network A 110 illustrated in FIG. 1, the print log generated by the information terminal 111a is transmitted to the management device 101 via the mediation device 112 and stored in the management device 101.

A description is now given of a situation where the information terminal 111a is taken out of the customer network A 110 and used to execute printing by using the image forming apparatus 141 provided in an external network 140 as illustrated in FIG. 2, for example.

In Step S710, the print control unit 412 of the information terminal 111a receives an operation of printing (print operation) performed by the user via the display input unit 417, for example. In Step S711, the print control unit 412 of the information terminal 111a generates print data to be printed by using the image forming apparatus 141 according to the received operation of printing and transmits the print data to the image forming apparatus 141.

In Step S712, the image forming apparatus 141 prints the print data transmitted from the information terminal 111a.

In Step S713, the print log generation unit 413 of the information terminal 111a generates a print log in which information such as print content, a print result, or the like of the printing performed by the print control unit 412 is recorded.

In Step S714, the communication unit 411 of the information terminal 111a checks whether the information terminal 111a and the mediation device 112 are communicably connected to each other. As illustrated in FIG. 2, the information terminal 111a is not communicably connected to the mediation device 112 through the LAN 113, thereby failing to communicate with the mediation device 112.

In Step S715, when the information terminal 111a fails to communicate with the mediation device 112, the print log storage unit 415 stores the print log generated by the print log generation unit 413.

As described above, for example, when the information terminal 111a executes the printing in the external network 140 illustrated in FIG. 2, the print log generated by the information terminal 111a is stored in the information terminal 111a.

A description is now given of a situation where the information terminal 111a is returned in the customer network A 110 and reconnected to the LAN 113 in the customer network A 110, as illustrated in FIG. 1, for example.

In Step S716, the communication unit 411 of the information terminal 111a checks whether the information terminal 111a and the mediation device 112 are communicably connected to each other. As illustrated in FIG. 1, the information terminal 111a is reconnected to the mediation device 112 through the LAN 113, thereby succeeding in communicating with the mediation device 112.

In Step S717, when the information terminal 111a succeeds in communicating with the mediation device 112, the second transmission unit 416 of the information terminal 111a reads the print log stored in the print log storage unit 415.

In Step S718, the second transmission unit 416 of the information terminal 111a transmits the print log read from the print log storage unit 415 to the mediation device 112 via the communication unit 411.

In Step S719, the print log transmitted by the second transmission unit 416 is deleted from the print log storage unit 415 of the information terminal 111a.

In Step S720, the device information transmission unit 424 of the mediation device 112 transmits the print log received from the information terminal 111a via the first communication unit 421 to the management device 101 via the second communication unit 423.

In Step S721, the device information management unit 432 of the management device 101 stores the print log of the information terminal 111a received from the mediation device 112 in the storage unit 433.

As described above, the management device 101 is able to collect and manage the print logs of printing executed in the external network 140 by the information terminal 111a, in addition to the print logs of printing executed in the customer network A110 by the information terminal 111a.

As described above, the device management system 100, which collects the print logs of the information terminal 111a, according to the present embodiment, is able to acquire the print logs of the information terminal 111a even when the information terminal 111a is used outside of the customer network A 110, by using the mediation device 112 installed in the customer network A 110.

Second Embodiment

In the above description of the first embodiment, the example in which the management device 101 collects and manages the print logs of the information terminal 111a is given. However, not limited to the print logs of the information terminal 111a, the management device 101 can also collect and manages information on usage of each of the various types of the electronic devices 111.

For example, the management device 101 may collect and manage a projection log (an example of the usage information) of a portable projector (an example of the electronic device 111). In addition, the management device 101 may collect and manage a teleconference log (another example of the usage information) of a portable videoconference terminal (another example of the electronic device 111).

In the following description of a second embodiment, an example in which the management device 101 collects and manages information on usage of each of the various types of the electronic devices 111 is given. Hereinafter, the various types of the electronic devices are collectively or individually referred to as the electronic device 111.

Functional Configuration

Figure 8:
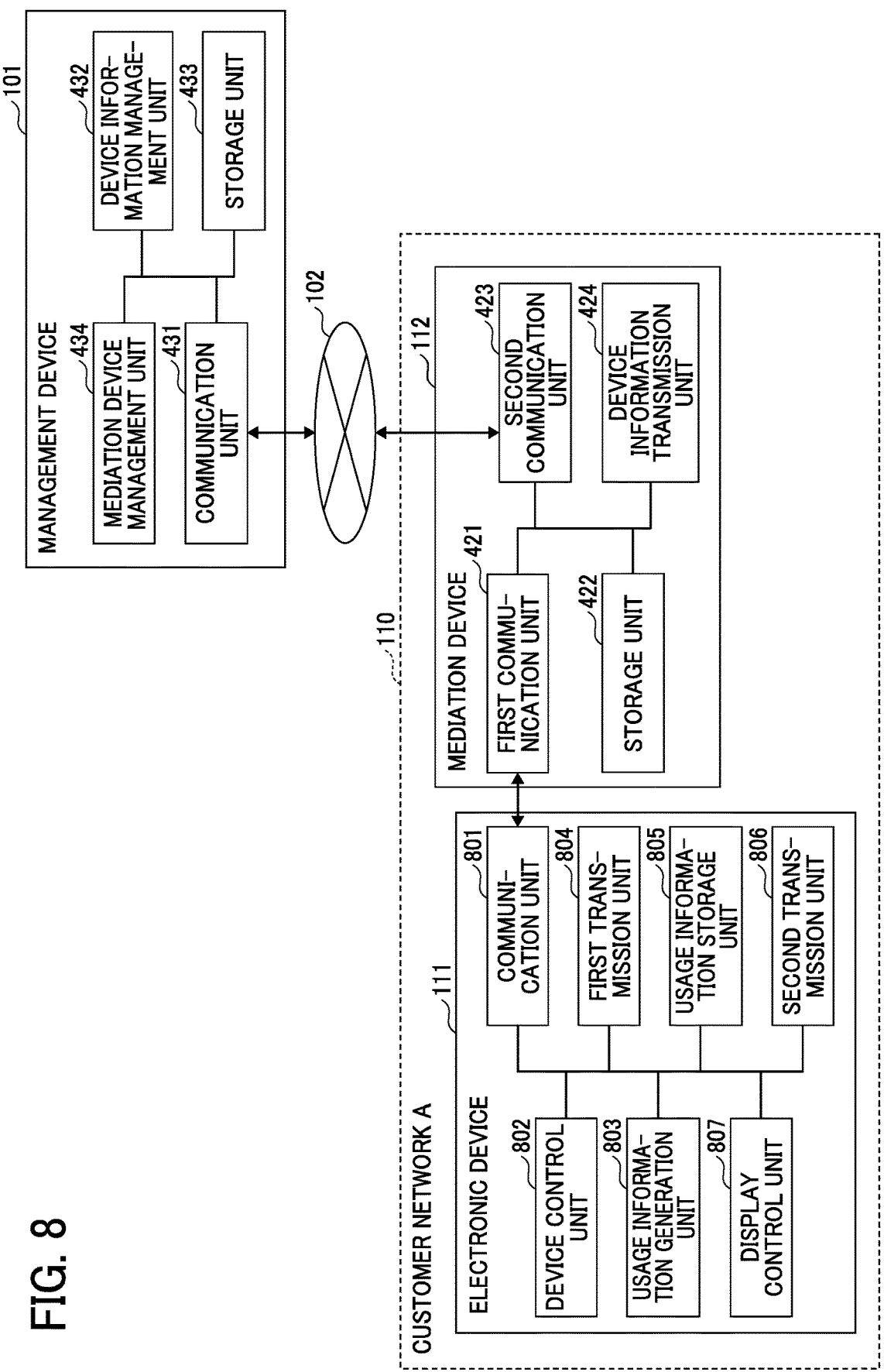
FIG. 8 is a block diagram illustrating a functional configuration of a device management system according to a second embodiment of the present disclosure.

FIG. 8 is a block diagram illustrating a functional configuration of a device management system 100 according to the second embodiment of the present disclosure.

Functional Configuration of Electronic Apparatus

The electronic device 111 includes, for example, a communication unit 801, a device control unit 802, a usage information generation unit 803, a first transmission unit 804, a usage information storage unit 805, a second transmission unit 806, and a display input unit 807. Each of the above-mentioned functional units of the electronic device 111 is implemented by the CPU 301 executing a predetermined program, for example.

In addition, the functional configuration of the electronic device 111 according to the second embodiment is similar to that of the information terminal 111a according to the first embodiment illustrated in FIG. 4. In the following description, differences from the information terminal 111a are mainly focused.

The communication unit 801 is implemented by the CPU 301 executing a program and the network I/F 305, for example. The communication unit 801 connects the electronic device 111 to the LAN 113 so that the electronic device 111 is communicably connected to the mediation device 112.

The device control unit 802 is implemented by a program executed by the CPU 301, for example. The device control unit 802 controls the functions of the electronic device 111. For example, when the electronic device 111 is a projector, the device control unit 802 controls projection of an image. Alternatively, when the electronic device 111 is a video conference terminal, the device control unit 802 controls communication, display processing, and the like related to conducting a video conference.

The usage information generation unit (generator) 803 is implemented by a program executed by the CPU 301, for example. The usage information generation unit 803 generates usage information (a usage log) in which usage content or a use result related to the electronic device 111 is recorded according to use of the electronic device 111.

For example, when the electronic device 111 is a projector, the usage information generation unit 803 generates use information including information such as a projection start time, a projection end time, information on a projected image, information on luminance, or the like. Alternatively, when the electronic device 111 is a videoconference terminal, the usage information generation unit 803 generates usage information including a video conference start time, a video conference end time, video conference information, information on a communication destination, or the like. The usage information generated by the usage information generation unit 803 includes image information, or image data, such as a projected image or a video image of a video conference (for example, a snapshot, etc.).

The first transmission unit 804 is implemented by a program executed by the CPU 301, for example. The first transmission unit 804 transmits the usage information to the mediation device 112, when the usage information generation unit 803 generates the usage information and when the communication unit 801 succeeds in communicating with the mediation device 112.

The usage information storage unit (storage unit) 805 is implemented by the CPU 301 executing a program and the memory 304, for example. The usage information storage unit 805 stores the usage information generated by the usage information generation unit 803 when the communication unit 801 fails to communicate with the mediation device 112.

The second transmission unit 806 is implemented by a program executed by the CPU 301, for example. The second transmission unit 806 transmits the usage information stored in the usage information storage unit 805 to the mediation device 112, when the communication unit 801 becomes to be communicably connected to the mediation device 112.

The display input unit 807 is implemented by a program executed by the CPU 301, for example. The display input unit 807 receives a user operation, such as a user operation performed with the input device 307 and displays a display screen by using the display 306, for example.

The functional configurations of the mediation device 112 and the management device 101 are substantially the same as those of the first embodiment, and the redundant description thereof is omitted here.

Processing Flow

Operation of Electronic Device

Figure 9:
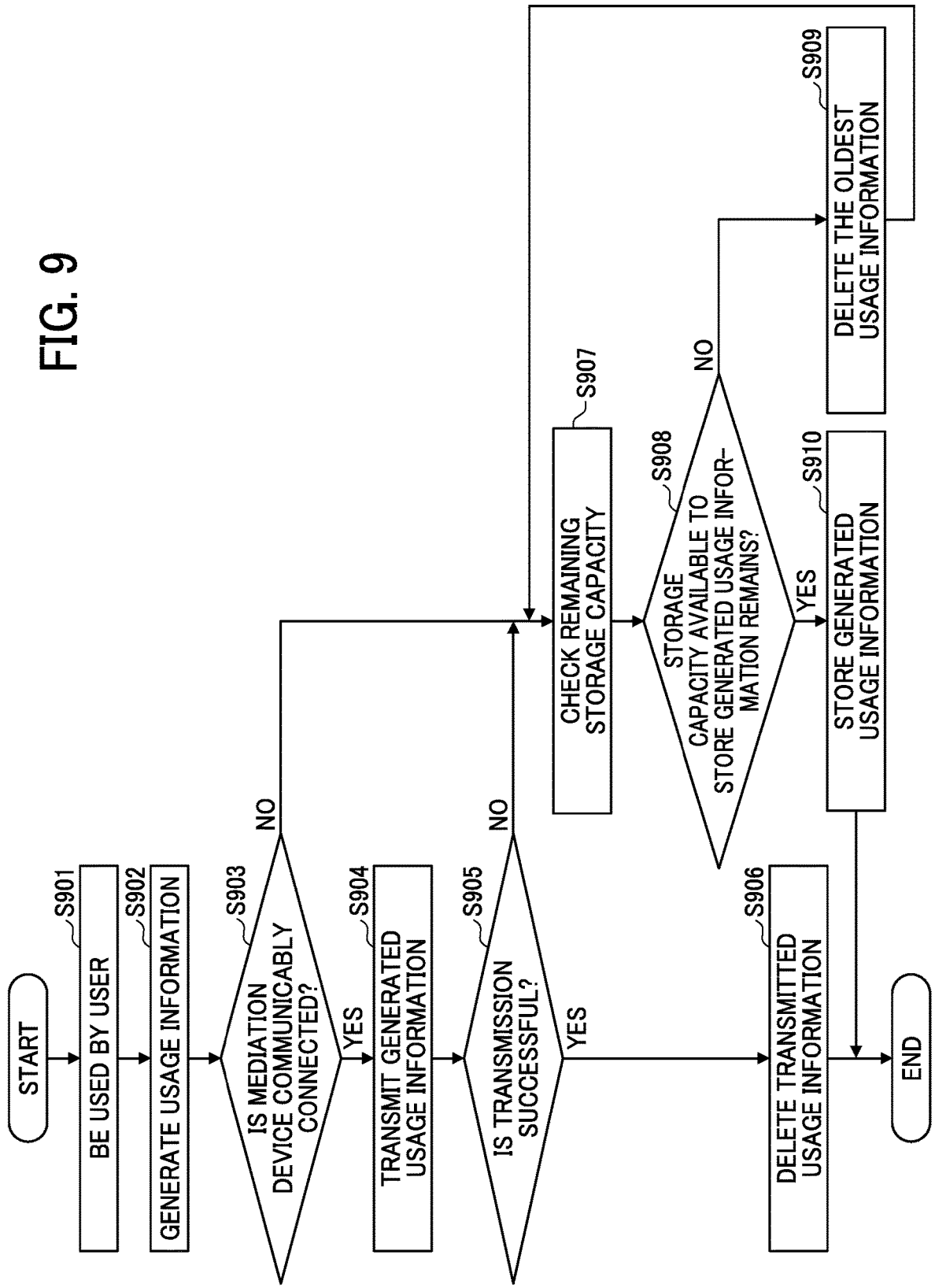
FIG. 9 is a flowchart illustrating an example of operation of an electronic device according the second embodiment of the present disclosure.

FIG. 9 is a flowchart illustrating an example of the operation of the electronic device 111 according the second embodiment of the present disclosure. The operation illustrated in FIG. 9 is an example of a process performed by the electronic device 111 when the electronic device 111 is used by a user. The process is similar to the process performed by the information terminal 111*a* according to the first embodiment described above with reference to FIG. 5, and the redundant description thereof is omitted here.

In Step S901, when the user uses the electronic device 111, the electronic device 111 executes the processing of Step 902 and the subsequent steps.

In Step 902, the usage information generation unit 803 generates usage information in which usage content or a use result related to the electronic device 111 is recorded.

In Step S903, the communication unit 801 determines whether the mediation device 112 and the electronic device 111 are communicably connected to each other through the LAN 113 or not. Namely, the mediation device 112 is communicably connected to the electronic device 111. When the mediation device 112 and the electronic device 111 are communicably connected to each other, the process proceeds to Step S904. When the mediation device 112 and the electronic device 111 are not communicably connected to each other, the process proceeds to Step 907.

In Step S904, the first transmission unit 804 transmits the usage information generated by the usage information generation unit 803 to the mediation device 112 via the communication unit 801.

In step S905, the electronic device 111 determines whether the transmission of the usage information is successful or not. When the transmission of the usage information is successful, the process performed by the electronic device 111 proceeds to Step S906. On the other hand, when the transmission of the usage information fails, the process performed by the electronic device 111 proceeds to step S907.

The electronic device 111 may determine that the transmission of the usage information fails when the first transmission unit 804 retries the transmission of the usage information for predetermined times, which may be set by a designer or a user, and fails to transmit the usage information to the mediation device 112.

In Step S906, the transmitted usage information is deleted from the usage information storage unit 805.

In Step S907, a remaining storage capacity in the usage information storage unit 805 is checked. For example, the usage information storage unit 805 is set to store usage information within a range of a predetermined storage capacity, which may be set by a designer or a user. The usage information storage unit 805, accordingly, checks a storage capacity available to newly store usage information in the predetermined storage capacity.

In Step S908, a determination whether there is a storage capacity available to store the usage information (new usage information) generated in Step S902 within the range of the predetermined storage capacity in the usage information storage unit 805 is made. When a determination result indicates that the usage information storage unit 805 is not available to store generated usage information, the process proceeds to step S909. On the other hand, when a determination result indicates that the generated usage information can be stored in the usage information storage unit 805, the process proceeds to step S910.

In Step S909, the oldest usage information among the stored usage information is deleted from the usage information storage unit 805, and the process returns to Step S907. Thus, the usage information storage unit 805 can increase the remaining storage capacity of the predetermined storage capacity.

On the other hand, in Step S908 after Step S910, the usage information storage unit 805 stores the usage information generated by the usage information generation unit 803 in Step S902, by using the memory 304, for example.

As described above, the electronic device 111 communicably connected to the mediation device 112 transmits, to the mediation device 112, the usage information generated according to the use of the electronic device 111. On the other hand, the electronic device 111 that is not communicably connected to the mediation device 112 stores the usage information generated according to the use of the electronic device 111.

Operation of Electronic Device in Connecting to LAN

FIG. 10 is another flowchart illustrating an example of the operation of the electronic device 111 according the second embodiment of the present disclosure. The operation illustrated in FIG. 10 is an example of a process performed by the electronic device 111 in reconnecting to the LAN 113 in the customer network A 110.

In Step S1001, the customer network A110 is detected. Upon detecting the customer network A 110 in Step S1001, the electronic device 111 executes the processing of Step 1002 and the subsequent steps. For example, when the communication unit 801 connects to the LAN 113 of the customer network A 110, the electronic device 111 determines that the customer network A 110 is detected.

In Step S1002, a determination whether usage information that is not transmitted to the mediation device 112 is stored in the usage information storage unit 805 or not is made. When the usage information is not stored, the process performed by the electronic device 111 ends. When the usage information is stored, the process performed by the electronic device 111 proceed to S1003.

In Step S1003, the communication unit 801 determines whether the mediation device 112 and the electronic device 111 are communicably connected to each other through the LAN 113 or not. Namely, the mediation device 112 is communicably connected to the electronic device 111. When the mediation device 112 and the electronic device 111 are not communicably connected to each other, the process performed by the electronic device 111 ends. On the other hand, when the mediation device 112 and the electronic device 111 are communicably connected to each other, the process proceeds to Step S1004.

In Step S1004, the second transmission unit 806 transmits the usage information stored in the usage information storage unit 805 to the mediation device 112 via the communication unit 801.

In Step S1005, the electronic device 111 determines whether the transmission of the usage information is successful or not. When the transmission of the usage information is successful, the process performed by the electronic device 111 proceeds to Step S1006. On the other hand, when the transmission of the usage information fails, the process performed by the electronic device 111 ends.

The electronic device 111 may determine that the transmission of the usage information fails when the second transmission unit 806 retries the transmission of the usage information for predetermined times, which may be set by a designer or a user, and fails to transmit the usage information to the mediation device 112.

In Step S1006, the transmitted usage information is deleted from the usage information storage unit 805.

As described above, the electronic device 111 transmits the usage information stored in the usage information storage unit 805 to the mediation device 112, when becoming to be communicably connected to the mediation device 112.

In the present embodiment, the usage information is stored within the range of the predetermined storage capacity and the usage information transmitted to the mediation device 112 is deleted. Therefore, the present embodiment can be suitably applied to any of the various types of the electronic device 111 having a relatively small storage capacity, such as a projector or a videoconference terminal.

In the device management system 100 according to one of the embodiment, in which information on usage of the electronic device 111 is collected by using the mediation device 112 provided in a local network, the information on the usage of the electronic device 111 can be collected, even when the electronic device 111 is used outside of the local network.

Any one of the above-described operations may be performed in various other ways, for example, in an order different from the one described above.

Each of the functions of the described embodiments may be implemented by one or more, processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic device, comprising:
a processor configured to
generate usage information indicating usage of the electronic device according to use of the electronic device,
communicate with a mediation device, the mediation device being communicably connected to the electronic device through a first network and to a management device through a second network, the management device collecting the usage information via the mediation device,
transmit to the mediation device the generated usage information when the electronic device is communicably connected to the mediation device through the first network, the mediation device acquiring the generated usage information from the electronic device and transmitting the acquired generated usage information to the management device, and
store, in a memory of the electronic device, the generated usage information when the electronic device is disconnected from the mediation device, wherein
the processor is further configured to transmit the usage information stored in the memory to the mediation device when the electronic device reconnects to the mediation device,
when newly storing the usage information in the memory, the processor is further configured to determine whether the memory is available to newly store the usage information in a range of a predetermined storage capacity, and
the processor is further configured to, after transmitting the generated usage information to the mediation device when the electronic device is communicably connected to the mediation device, delete the generated usage information transmitted to the mediation device, from the memory of the electronic device.

2. The electronic device of claim 1, wherein
the electronic device is an information terminal configured to control execution of printing, and
the processor is further configured to generate the usage information that includes print content of the printing according to the printing.

3. The electronic device of claim 2, wherein,
the print content includes image data recording the print content of the printing.

4. The electronic device of claim 1 wherein,
the processor is further configured to store, in the memory, the usage information within the range of the predetermined storage capacity in the memory.

5. The electronic device of claim 4, wherein,
when determining that the memory is not available to newly store the usage information in the range of the predetermined storage capacity, the processor is further configured to delete oldest usage information among the usage information stored in the memory to newly store the usage information.

6. The electronic device of claim 1, wherein
the mediation device acquires the generated usage information from the electronic device through the first network and transmits the acquired generated usage information to the management device through the second network.

7. The electronic device of claim 1, wherein
the processor is further configured to transmit the usage information at predetermined times after failing to transmit the usage information stored in the memory, and
the memory retains the usage information that is failed to be received by the mediation device after the processor transmits the usage information at the predetermined times.

8. A device management system, comprising:
one or more electronic devices;
a mediation device communicably connected to the one or more electronic devices through a first network;
a management device communicably connected to the mediation device through a second network and configured to collect usage information indicating usage of each of the one or more electronic devices via the mediation device,
each of the one or more electronic devices including:
a processor configured to
generate the usage information according to use of the electronic device,
communicate with the mediation device communicably connected to the electronic device through the first network, and
transmit to the mediation device the generated usage information when the electronic device is communicably connected to the mediation device through the first network; and
a memory configured to store the generated usage information when the electronic device is disconnected from the mediation device, wherein
the processor is further configured to transmit the usage information stored in the memory to the mediation device when the electronic device reconnects to the mediation device,
when newly storing the usage information in the memory, the processor is further configured to determine whether the memory is available to newly store the usage information in a range of a predetermined storage capacity,
the processor is further configured to, after transmitting the generated usage information to the mediation device when the electronic device is communicably connected to the mediation device, delete the generated usage information transmitted to the mediation device, from the memory of the electronic device, and
the mediation device is configured to acquire the generated usage information from the electronic device and transmit the acquired generated usage information to the management device.

9. A method for an electronic device, the method comprising:
generating usage information indicating usage of the electronic device according to use of the electronic device;
communicating with a mediation device, the mediation device being communicably connected to the electronic device through a first network and to a management device through a second network, the management device collecting the usage information via the mediation device;
transmitting to the mediation device the generated usage information when the electronic device is communicably connected to the mediation device through the first network, the mediation device acquiring the generated usage information from the electronic device and transmitting the acquired generated usage information to the management device;
storing, in a memory of the electronic device, the generated usage information when the electronic device is disconnected from the mediation device; and
transmitting the usage information stored in the memory to the mediation device when the electronic device reconnects to the mediation device, wherein
when the storing newly stores the usage information in the memory, determining whether the memory is available to newly store the usage information in a range of a predetermined storage capacity; and
after transmitting the generated usage information to the mediation device when the electronic device is communicably connected to the mediation device, deleting the generated usage information transmitted to the mediation device, from the memory of the electronic device.

* * * * *